No. 627,284. Patented June 20, 1899.
L. B. WALKER.
HAND TRUCK.
(Application filed Feb 27, 1899.)
(No Model.)
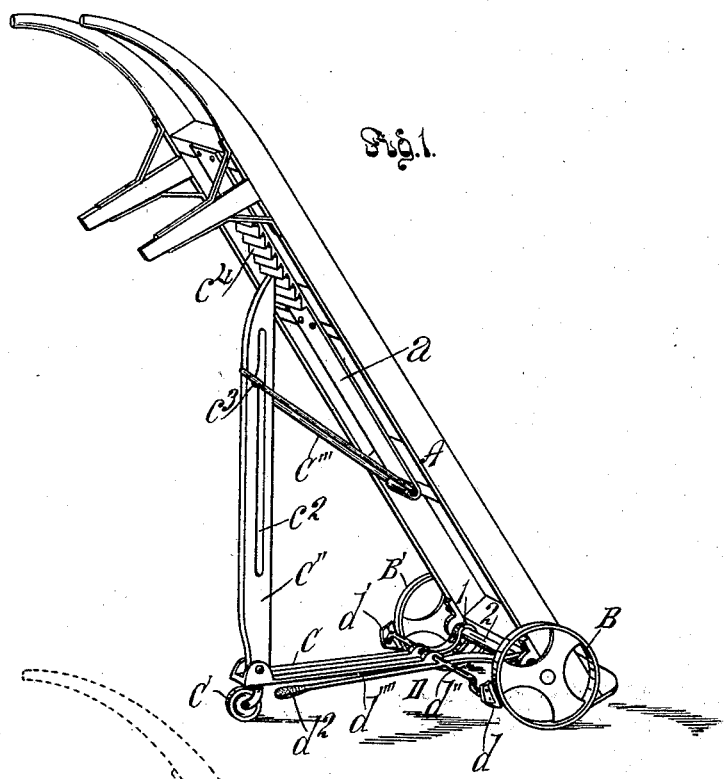
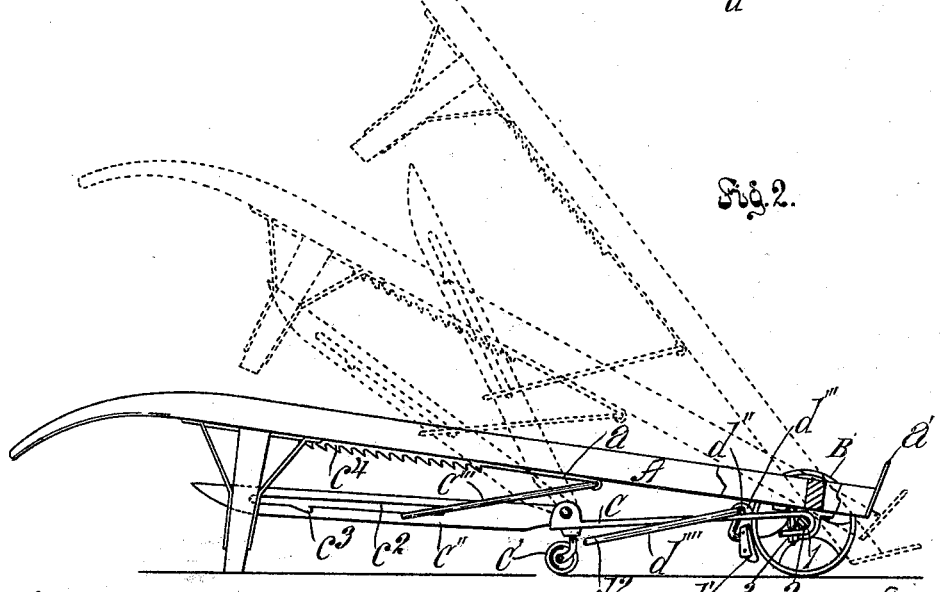
Witnesses
Gerry Kingman.
E. A. Waterman.
Inventor
Lucian B Walker
by Townsend Bro
his atty

UNITED STATES PATENT OFFICE.

LUCIAN B. WALKER, OF GLENDORA, CALIFORNIA, ASSIGNOR OF ONE-HALF TO L. N. SUYDAM, OF SAME PLACE.

HAND-TRUCK.

SPECIFICATION forming part of Letters Patent No. 627,284, dated June 20, 1899.

Application filed February 27, 1899. Serial No. 707,064. (No model.)

*To all whom it may concern:*

Be it known that I, LUCIAN B. WALKER, residing at Glendora, in the county of Los Angeles and State of California, have invented new and useful Improvements in Hand-Trucks, of which the following is a specification.

One object of my invention is to provide means for maintaining a hand-truck in an upright position when loaded when it is desired to leave the truck standing upon scales or other place without resting the load upon the ground or floor.

Another object of my invention is to provide a hand-truck with means for preventing the truck from moving away from the load which is to be loaded upon it when the nose of the truck is inserted under the load and the handles of the truck are pulled backward with the load on the truck-frame.

Where large numbers of packages or sacks are loaded upon hand-trucks and are run upon scales and weighed, it has heretofore been customary for the laborer to tilt the truck forward until the load rested upon the scale-platform, and after the weighing of the packages and truck it is necessary for him to put one foot behind the axle of the truck to brace it to keep the truck from rolling backward and reach over with one arm and grasp the load and pull it backward upon the frame of the truck, meanwhile supporting the truck-frame with the other hand. By my device the truck is run upon the platform of the scales and the support is thrown into engagement, and the truck-frame stands at an incline supporting the packages or boxes. After the weighing the support is thrown out of engagement, thus providing against a loss of time and excess of labor to the operator.

My invention is so constructed that the device is out of the way when not in use for supporting the truck.

The accompanying drawings illustrate my invention.

Figure 1 is a perspective view of my truck in its supported position. Fig. 2 is a side elevation of my newly-invented truck, partly in section. Dotted lines indicate different positions of the truck when the support-arm is left free.

A indicates the truck-frame; B B', the truck-wheels which carry the truck-frame. The wheels and frame are the same as those in ordinary trucks, and in practice the parts of the truck which embody my invention can be manufactured and sold as an attachment to be applied to trucks already in use. Trucks may also be manufactured with the device applied ready for use.

My attachment for the hand-truck comprises a jointed support pivoted to the hand-truck behind the same and a catch on the body of the hand-truck for engagement with the support. A connecting device connects a movable arm of the support with the frame of the truck. The support comprises a supporting-frame C, provided with a supporting-wheel C' and a supporting-arm C'', which is pivoted to the rear end of the supporting-frame C.

C''' indicates the connecting device, which is preferably a link, as shown in the drawings, pivoted to the body A of the truck and playing in a guideway in the pivoted supporting-arm. The guideway preferably is provided by forming a slot $c^2$ in the pivoted arm C''.

$c^3$ indicates a catch on the pivoted arm C'' to catch the link C'''.

$c^4$ indicates a catch for the upper end of the arm C''. This catch preferably consists in a number of ratchet-teeth on a plate $a$, which is fastened to the frame A of the truck. The supporting-frame C is preferably pivoted to the truck by means of hooks 1, which hook over the axle 2 of the truck, a bolt 3 being inserted through the frame to prevent the hooks from being unhooked.

D indicates the brake for holding the truck when it is desired to prevent it from slipping back when the operator is attempting to force the nose-ledge $a'$ under a package or other body to be lifted. This brake comprises the brake-shoes $d\ d'$, mounted on the brake-beam $d''$, which is journaled, as at $d'''$, to the frame C.

$d''''$ indicates an arm which projects rearward from the brake beam or bar $d''$ and is provided at its rear end with a foot-plate $d^2$.

In practical operation when the workman forces the nose-ledge $a'$ under the body to be lifted he will raise the handles of the truck in the ordinary manner to bring the nose to the desired position with the ledge ready to insert under the body to be loaded and insert the nose under the load in the ordinary manner. Then pressing the foot down upon the foot-plate $d^2$ the brake is thus forced against the wheels, thus to prevent them from turning, and the truck is thus firmly held against slipping back. When the load has been loaded, the truck can be brought down into wheeling position and can be moved freely up and down without any interference with the supporting-arm. When the operator desires to support the truck—as, for instance, in case of leaving the truck upon the scales—the link will be thrown up so as to catch in the catch on the supporting-arm. This throws the upper end of the supporting-arm into engagement with the catch on the body of the truck-frame, and thus prevents the truck from lowering. When it is desired to again lower the handles, the link is dropped out of the catch, and the truck is again free to be handled as an ordinary truck.

It will be understood that while the link remains in the lower end of the slot in the supporting-arm the supporting-arm is held away from engagement with the ratchet-plate on the truck-frame and the truck is used in the ordinary way. When the link is thrown into the notch at the upper end of the slot in the arm, the arm is brought into position to engage with the ratchet.

When it is desired, the attachment can be removed from the truck, the bolts 3 being withdrawn to allow the hooks to be unhooked.

Now, having described my invention, what I claim as new, and desire to secure by Letters Patent, is—

1. The combination with a hand-truck, of a jointed support comprising a member pivoted to the axle of the hand-truck to extend behind the same, a supporting-wheel at the rear end of such member, and an arm pivoted at one end to such member to extend upward therefrom with its other end free to engage the truck-frame; and a catch on the body of the hand-truck for engagement with such free end.

2. The combination with a hand-truck, of a support pivoted to the hand-truck and extending behind the same; and a brake mounted on said support and with a lever for operating the brake.

3. The combination with a hand-truck, of a jointed support pivoted to the hand-truck and extending behind the same, said support being provided with an arm having a guideway and a catch; a connecting device pivoted to the truck-frame and working on the truck-frame to catch the support.

4. The combination with a hand-truck, of a supporting-frame pivoted to the hand-truck and extending behind the same and provided with a supporting-wheel; a supporting-arm pivoted to the supporting-frame and provided with a guideway and a catch; a connecting device to work in the guideway and catch; and a catch on the frame of the truck to catch the supporting-arm.

5. The combination with a hand-truck, of a supporting-frame pivoted to the hand-truck and extending behind the same; a slotted supporting-arm pivoted to the supporting-frame and provided with a catch; a link pivoted to the hand-truck frame and playing in the slot and adapted to catch on the catch; and a catch on the hand-truck frame to catch the support.

6. The combination with a truck, of the rearwardly-extending horizontal frame fastened to the truck-axle; the frame-supporting wheel; the supporting-arm pivoted to the horizontal frame; means pivoted to the truck-frame to engage the supporting-arm and adapted to travel along its length whereby such arm is held in a position relative to the truck-frame, and the catch upon the truck-frame adapted to engage with the end of the supporting-arm.

LUCIAN B. WALKER.

Witnesses:
F. M. TOWNSEND,
N. A. STAMM,
E. WOOLMAN.